United States Patent [19]

Singer et al.

[11] 4,032,987

[45] June 28, 1977

[54] SOUND RECORDING AND REPRODUCING APPARATUS USING A CASSETTE HAVING A CASING MADE OF REFLECTIVE MATERIAL

[75] Inventors: Franz Singer, Munich; Paul Fahlenberg, Baierbrunn; Rudolf Lang, Grafing Bhf., all of Germany

[73] Assignee: Compur-Werk Gesellschaft mit beschrankter Haftung & Co., Munich, Germany

[22] Filed: Sept. 16, 1975

[21] Appl. No.: 613,861

[30] Foreign Application Priority Data

Sept. 25, 1974 Germany .......................... 2445751

[52] U.S. Cl. ................................ 360/132; 360/72; 360/74; 360/96
[51] Int. Cl.² .................. G11B 15/18; G11B 15/08; G11B 23/04; G11B 23/34
[58] Field of Search ............... 360/132, 72, 74, 71, 360/93, 96, 69; 242/188, 194, 197–199; 250/548, 570, 571; 356/199

[56] References Cited

UNITED STATES PATENTS

| | | |
|---|---|---|
| 3,614,453 | 10/1971 | Johnson .............................. 360/74 |
| 3,684,208 | 8/1972 | Larsen .............................. 360/132 |
| 3,909,845 | 9/1975 | Rothlisberger et al. ............. 360/74 |
| 3,925,817 | 12/1975 | Althuber et al. ..................... 360/74 |
| 3,932,889 | 1/1976 | Takeda et al. ....................... 360/74 |

*Primary Examiner*—Alfred H. Eddleman
*Attorney, Agent, or Firm*—Blanchard, Flynn, Thiel, Boutell & Tanis

[57] ABSTRACT

A sound recording and reproducing apparatus utilizing replaceable magnetic tape cassettes. The sound recording and reproducing apparatus includes an arrangement for the detection of a specified position of the tape utilizing a light detection unit which is installed in the apparatus. The light detection unit consists of a light emitting device together with a light receiving device. The casing of the cassette includes a reflective portion thereon which is placed in reflective alignment between the light emitting device and the light receiving device. Light can only be transmitted between the light emitting device and the light receiving device once a specified position of the tape is achieved.

8 Claims, 7 Drawing Figures

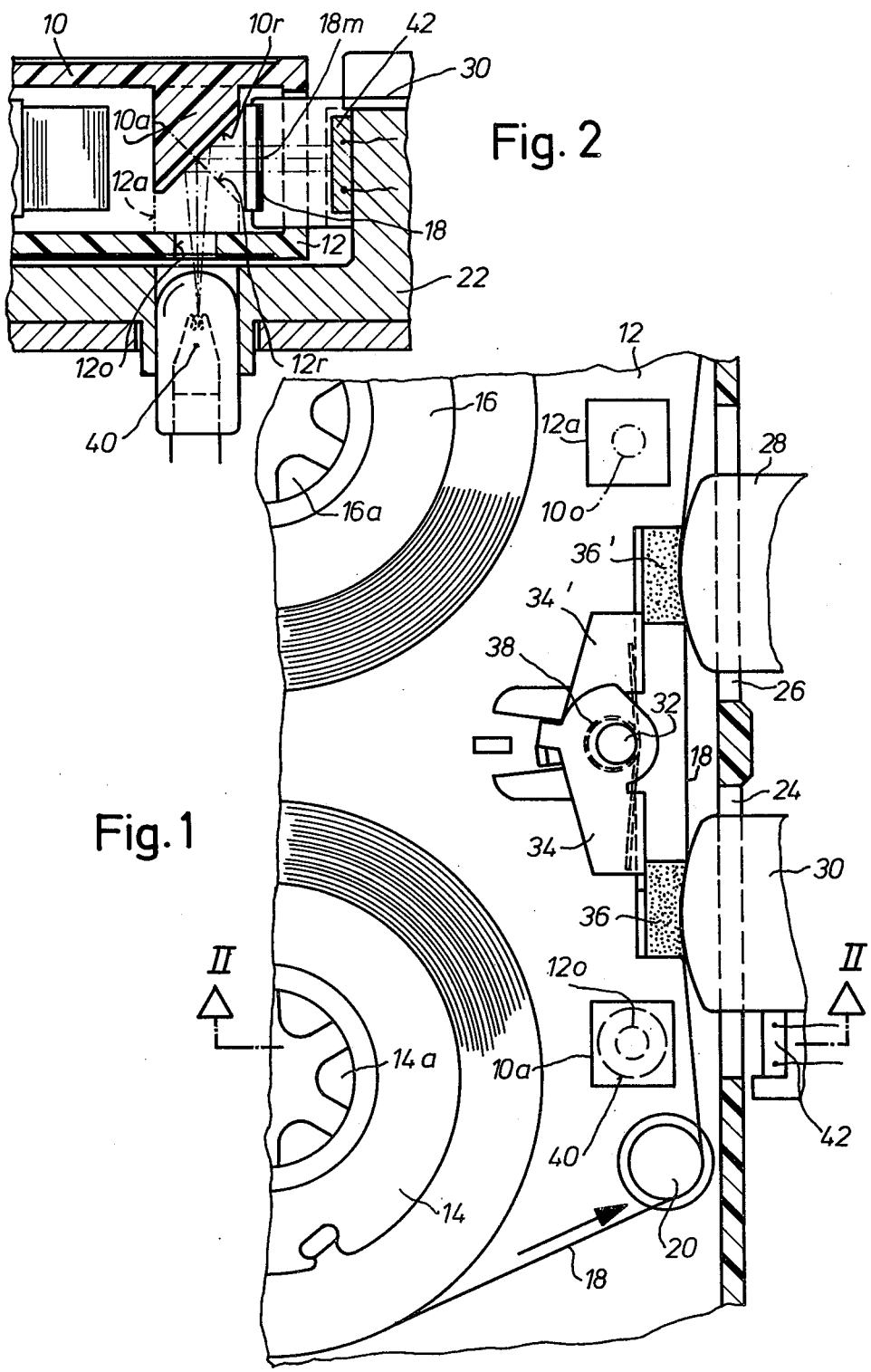

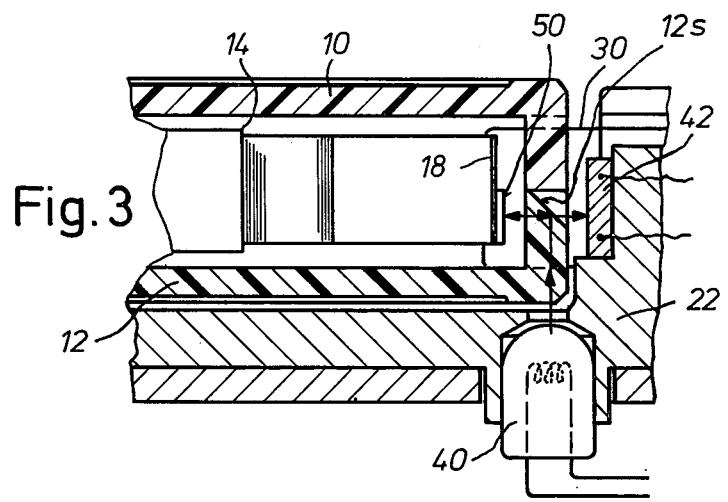
Fig. 3
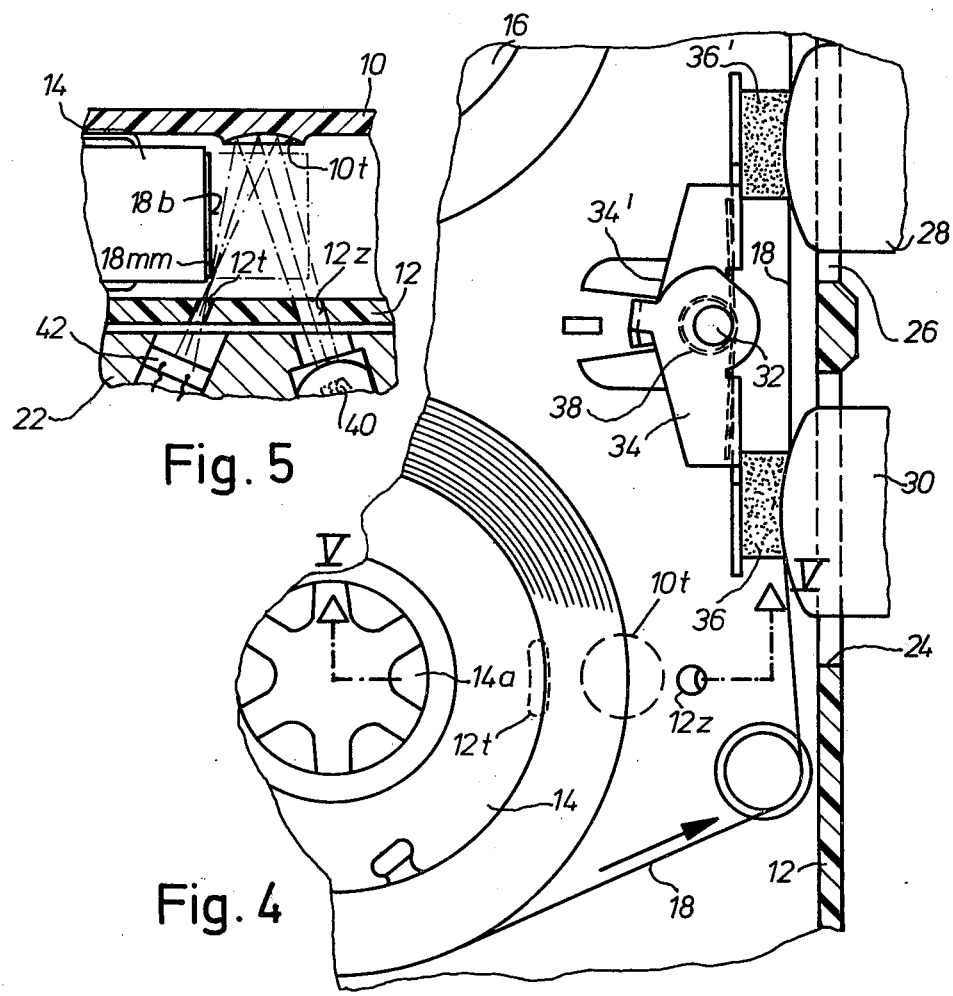
Fig. 5
Fig. 4

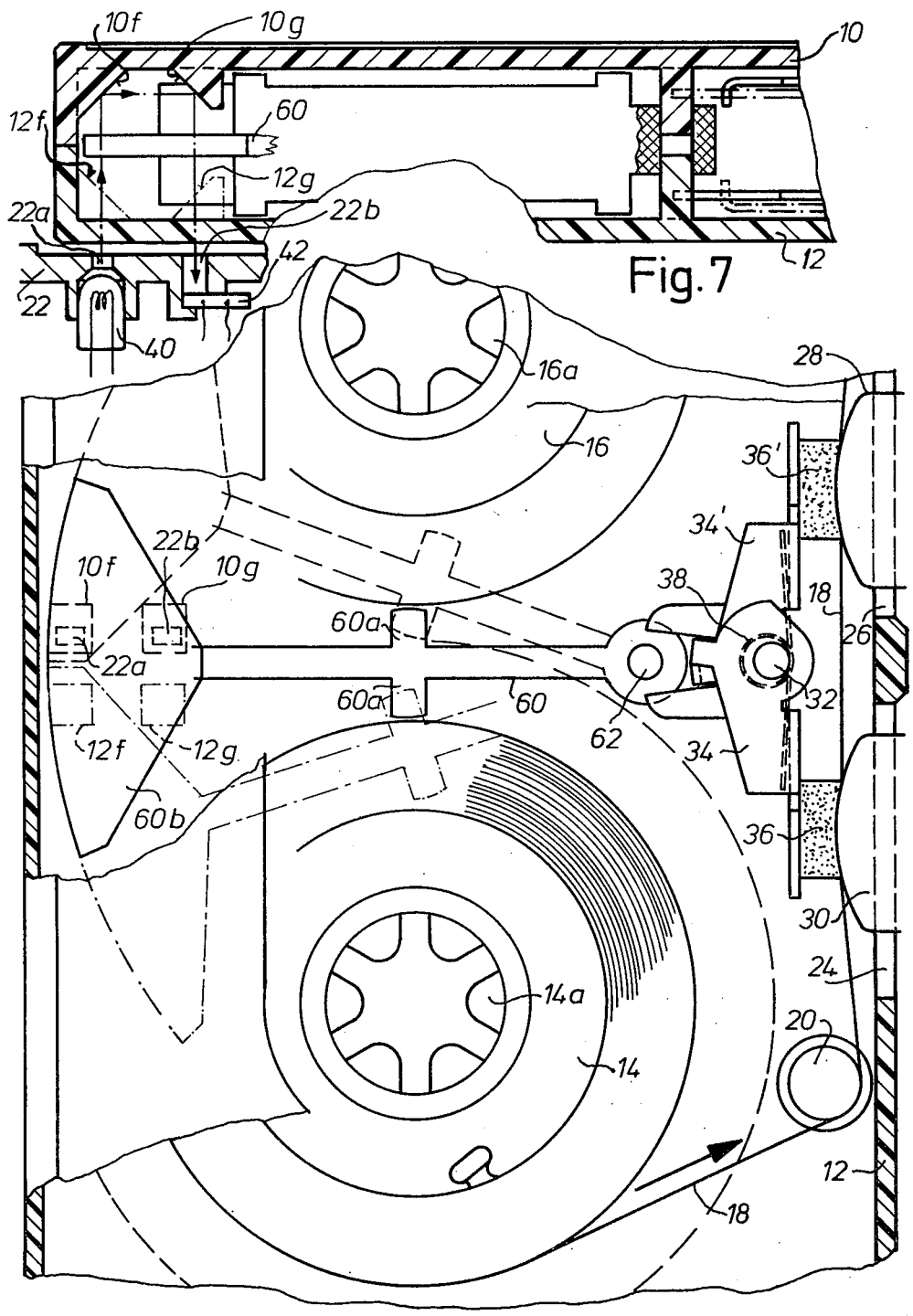

SOUND RECORDING AND REPRODUCING APPARATUS USING A CASSETTE HAVING A CASING MADE OF REFLECTIVE MATERIAL

FIELD OF THE INVENTION

This invention relates to a sound recording and reproducing apparatus comprising a replaceable magnetic tape cassette, and an arrangement for the detection of a specific position of the tape using a light utilizing unit which is installed in the apparatus and comprises a light emitting means together with a light receiving means.

BACKGROUND OF THE INVENTION

Frequently, use is made of rectilinear light utilizing units in large apparatus so that, for example, the approach of the end of the tape is perceived at an early stage and the drive of the tape can be stopped by an auxiliary arrangement in good time.

In the case of apparatus of minimum size using replaceable mini-cassettes, use of such means has however serious difficulties. On the one hand, for sheer reasons of space, it is hardly possible to provide for a rectilinear light path from the light source through the magnetic tape. On the other hand, the use of reversing mirrors or the like which have to be separately installed in the cassette to provide for a labyrinthic path of the light beam at the appropriate places is not viable costwise.

It is an object of the present invention to provide means which will cater for a labyrinthic light passage even through a mini-cassette without additional trouble and expense. This problem is met in the present invention by the fact that the casing of the cassette is made of a reflecive material, and that this casing has a projection which extends into the light path of the light utilizing unit and is provided with at least one reflecting surface which deflects the light beam from the light emitter to the light receiver after the position of the tape has been monitored. The flat or concave reflecting surface of the cassette casing, which may be made as an infection molding of a transparent material, can be produced actually during the injection molding operation in accordance with a further feature of the invention. The modern state of development of injection molding enables the reflecting surfaces in the cassette casing to be produced with an adequate degree of efficacy and on a large scale without difficulty and without additional expense in the course of the operation of injection molding the cassettes. A further result is that the passage of light from the light source within the cassette can be optimal.

The reflecting surfaces formed in accordance with the present invention can be used without retraction in any type of cassette construction and with any type of light unit, that is to say irrespective of whether the specific and critical position of the tape is identified by an aperture or reflecting surface on the tape. Moreover, the light aperture providing access to the light source can, for example, be controlled by a member monitoring the tape winding or by the tape winding itself.

A preferred embodiment of the invention is related to apparatus having a magnetic tape provided with two superimposed tracks in which each of these tracks can be brought into operation by reversing the cassette, and two light reflecting faces are arranged in the cassette casing in symmetrical disposition relatively to the reversing plane of the cassette so that a reflecting surface is made available to the elements of the light unit in each of the two positions of the cassette.

BRIEF DESCRIPTION OF THE DRAWINGS

Embodiments of the invention are described below with reference to the accompanying drawings in which:

FIG. 1 illustrates a first embodiment of the light utilizing unit in longitudinal section taken through the cassette;

FIG. 2 is a cross section on the line II-II of FIG. 1;

FIG. 3 is a section through a further embodiment;

FIG. 4 illustrates a third embodiment likewise in longitudinal section through the cassette;

FIG. 5 is a cross section V-V of FIG. 4; and

FIGS. 6 and 7 are respectively a longitudinal section and a cross section through the cassette in yet another embodiment.

DETAILED DESCRIPTION

The cassette illustrated comprises two like flat casing halves 10 and 12 of quadrilateral form, these being made of plastics material and connected together by fastening means (not shown). Mounted in this cassette are two flat reels 14 and 16 which are used to wind off and wind up the magnetic tape 18. Coaxial with each of these reels are driving means 14a, 16a (an internally toothed driving pinion) which engage appropriate driving means when the cassette is mounted in the recording and reproducing apparatus. Two diverting pins 20 are held between the halves of the casing and guide the tape 18 along the narrow front face of the cassette, this face being provided with two openings 24 and 26. Magnetic heads of the apparatus, namely the sound recording and reproducing head 28 and the erasing head 30, project into the interior of the cassette when this is mounted in the conventional way in the apparatus. The housing of the apparatus is only partially illustrated in FIG. 2 and is designated 22.

A mounting pin 32 is held in the casing halves 10 and 12 midway between the two openings 24 and 26 permitting the passage of the magnetic heads 28 and 30. Two pivotal levers 34 and 34' of identical shape are movably mounted on this pin 32. Each of these levers has a blade which is approximately parallel to the tape 18, and a piece of felt 36 and 36', respectively, is attached, for example cemented, to each blade. Thus each piece of felt 36 or 36' is disposed opposite to the magnetic head 28 or 30 to guide and press the passing tape 18.

The turns of a torsion spring 38 are disposed around the mounting pin 32 and the ends of this spring which project approximately diametrically from these turns are applied against the two pivotal levers 34 and 34'. As a result, the lever 34 is biased counterclockwise and lever 34' clockwise by the spring 38 to apply the felt pieces 36 and 36' resiliently against the tape 18 and press it against the magnetic heads.

During recording, the tape 18 runs in the direction indicated by an arrow in FIG. 1, being reeled off the supply reel 14 and wound up again on the reel 16. It is now necessary, when the end of the tape on the supply reel 14 is reached, to stop the tape drive to avoid any excessive tug on the tape which could result in interference with the operation, as a result, for example, of a tearing of the tape. For this reason, it is known to use photoelectric light utilizing units which come into operation to interrupt the drive of the tape when the latter has reached a specific position.

In the embodiment illustrated in FIGS. 1 and 2, the light utilizing unit has a light emitting element in the form of a lamp 40 and a light receiving element in the form of a photoelectric resistance 42. Both elements are fixedly mounted in the apparatus 22. An aperture 18m in the tape 18 is here used to identify the specific position of the tape when the end of the latter is reached. As soon as this aperture 18M passes, the light beam from the lamp is able to pass from lamp 40 to the photoelectric resistance 42 to induce at the latter an electrical pulse which is used to operate the stop device for the tape drive.

In the present instance, the cassette halves 10, 12 are made of a thermoplastically moldable plastics material in which the surfaces produced in the injection molding operation have adequate reflecting properties. It is possible in this way to provide a projection at the appropriate part of the cassette half and to use the surface of this projection as a reflective face to deflect the light beam from the light emitter mounted in the apparatus through the cassette and back to the light receiver also mounted in the apparatus.

In the construction illustrated in FIGS. 1 and 2, a rectangular projection 10a is provided on the inner side of cassette half 10, this having a bevel surface 10r which is used for reflecting purposes. The light beam penetrating from the lamp 40 through an opening 12° into the cassette travels along a path perpendicular to a plane which is perpendicular the axes of rotation of the reels 14 and 16 and is deflected through a 90° angle on to the photoelectric resistance 42 when the identification opening 18m passes the light beam.

It is also known to make the magnetic tape 18 wide enough to permit the use of a tape having two parallel tracks thereon. The cassette 10,12 can be inverted about the plane of symmetry passing between the reels 14,16 and heads 28,30 and inserted into the apparatus in the posture illustrated in FIGS. 1 and 2 or in the inverted posture. In either position, a projection is positioned directly above lamp 40. In the reversed condition, a projection 12a, which is symmetrically offset to the reversing plane, is provided in the cassette half 12, the reflective surface 12r of the projection 12a serving to provide for a deflection of the light beam from the lamp 40 in this reversed status.

As a means of identifying the end of the tape, instead of using an aperture in the tape, a small light reflecting coating can be applied to the tape for this purpose. An example of this is illustrated in FIG. 3. Here a small thin reflecting patch 50 is adhered to the tape 18 to identify the end position of the latter. A reflecting surface 12s is again provided in the cassette half 12 and this deflects the beam from the light source 40 in the direction to the tape 18. Immediately the reflecting patch 50 reflects the light back and passes partially through the reflecting surface 12s and reaches the light receiver 42 where it produces the stop signal.

FIGS. 4 and 5 show another embodiment. In this embodiment, the approach of the end of the tape is monitored by the fact that the reel of tape itself allows the beam to pass at the predetermined position of the tape, namely the end of the tape. To this end the beam of light from the lamp 40 passing through opening 12z in the cassette half 12 travels along a path transverse to a plane which is perpendicular to the axes of rotation of the reels 14 and 16 and is reflected to the cassette half 12 by a reflecting surface 10t and — as soon as the tape reel 18b has dwindled to a minimum size on the supply reel 14 — the deflected light beam is allowed to pass through an opening 12t in the cassette half 12 to the light receiver 42, which then emits the stop pulse. By making the reflecting surface 10t concave, the light beam is strongly focused at the measuring point 18mm to provide for an exact control.

Finally, FIGS. 6 and 7, show a further construction. In this arrangement, a detector member 60 is mounted on the mounting pin 62 for pivoting between the reels 14 and 16. This detector member 60 has two lateral arms 60a which will cooperate with one tape reel or the other, thereby enabling the member 60 to swing in one or the other direction depending on the thickness of one reel and the other. Secured to the end of the detecting member 60 is a segmental cover flap 60b. Where the spools 14 and 16 are of the same thickness, this flap assumes the central position shown in full lines in FIG. 6. When the tape on reel 14 is unwound therefrom the cover flap assumes the bottom pivoted position illustrated in dash-dotted lines in FIG. 6, while when the tape 18 is fully wound up on reel 14, the cover flap is at its uppermost position illustrated in dashed lines.

Provided in the cassette half 10 are two projections with reflecting surfaces 10f and 10g to deflect the light beam from lamp 40 to the photoelectric resistance 42. The passage of light is admitted by corresponding openings 22a and 22 b in the housing of the apparatus 22. The beam from the lamp is, however, only allowed to pass by the cover flap 60b when the flap of detector member 60 has assumed its lower position illustrated in FIG. 6, i.e. when the tape has been fully wound up on reel 16. In other positions, the passage of light is obstructed by this.

To enable the cassette to be inverted and used in an arrangement of this character, a further pair of reflecting surfaces 12f and 12g are provided in the cassette half 12, these taking over the function of diverting the light beam from the lamp when the cassette is reversed.

The constructions described represent only a few possible embodiments. The method used in this invention for producing and applying reflecting surfaces to the walls of the cassette can be implemented in other ways adapted without difficulty to the space available in the magnetic tape apparatus or in the cassette.

The embodiemnts of the invention in which an exclusive property or privilege is claimed are defined as follows:

1. The combination of a sound recording and reproducing apparatus having a replaceable magnetic tape cassette having rotatable reels therein, said tape having two tracks thereon, each track being utilizable by reversing said cassette, detection means for detecting a specific winding position of the tape using a light utilizing unit which is installed in the apparatus, said light utilizing unit comprising a light emitting means and a light receiving means, said light emitting means being located on one side of said cassette to transmit light in a direction transverse to a plane perpendicular to the axes of rotation of said reels, the casing of said cassette being made of a reflective material, said casing having first and second projections each provided with at least one reflecting surface for reflecting the light beam from said light emitting means to said light receiving means in response to a monitoring of the position of the tape and said first and second projections with their reflecting surfaces being arranged in the cassette casing in symmetrical disposition relative to the reversing plane of the cassette so that a reflecting surface is made available to the elements of said light utilizing unit in each of the two positions of the cassette.

2. Apparatus according to claim 1, wherein said cassette casing is made of a light transparent material ; and wherein said reflecting surfaces are defined by a flat face on the cassette casing located in the path of light in said transparent material.

3. Apparatus according to claim 1, wherein said cassette casing is made of a light transparent material; and wherein said reflecting surfaces are comprised of a concave surface on the cassette casing located in the path of light in said transparent material.

4. Apparatus according to claim 1, wherein an aperture is provided in said magnetic tape which permits the passage of light to a reflective surface and to the light receiver at a predetermined position of the tape.

5. Apparatus according to claim 1, wherein a reflecting mark is provided on said magnetic tape which reflects the light beam from a reflective surface and to the light receiver when the tape is in a specified position.

6. Apparatus according to claim 1, including a movable member mounted in said cassette and moves in response to the amount of tape wound on to a reel , a movement of said member to a position wherein more tape is on one reel than on the other effecting an opening of the light path to the reflective surface and the receiver .

7. Apparatus according to claim 1, wherein a light aperture is in said cassette beneath the tape winding, which is unveiled by the tape winding when the latter reaches a specified position to permit the passage of the light beam through said light aperture to the light receiver.

8. Apparatus according to claim 1, including means defining a light aperture in said cassette in the path of light between said light emitter and said light receiver.

* * * * *